United States Patent [19]
Hoenig et al.

[11] 3,818,219
[45] June 18, 1974

[54] NON-DESTRUCTIVE TESTING OF METAL STRUCTURES BY MEASURING EXO-ELECTRON EMISSION

[75] Inventors: Stuart A. Hoenig; William E. Ott, both of Tucson, Ariz.

[73] Assignee: The United States of America as represented by the Secretary of the Air Force

[22] Filed: Apr. 18, 1972

[21] Appl. No.: 245,150

[52] U.S. Cl............... 250/49.5 R, 250/49.5 AE
[51] Int. Cl. ................................. G01n 23/00
[58] Field of Search ... 250/49.5 R, 49.5 A, 49.5 AE

[56] References Cited
UNITED STATES PATENTS
3,435,207   3/1969   Baldwin ..................... 250/49.5 X OTHER PUBLICATIONS
"Exo–Electron Emission" by S. A. Hoenig from Materials Evaluation, Vol. 29, No. 9, Sept., 1971, page 33A.
"Electron Microscope" by C. Schuler from IBM Technical Disclosure Bulletin, Vol. 6, No. 10, March, 1964, pages 110 & 111.

Primary Examiner—William F. Lindquist
Attorney, Agent, or Firm—Harry A. Herbert, Jr. et al.

[57] ABSTRACT

A method for the non-destructive testing of a metal structure is provided that comprises heating the structure in the presence of ultraviolet radiation to a temperature sufficient to cause exo-electron emission from the structure; continuously measuring an electrical current resulting from exo-electrons flowing to a metal collector maintained at a positive potential, and determining the magnitude of the electrical current as a measure of fatigue damage.

11 Claims, 5 Drawing Figures

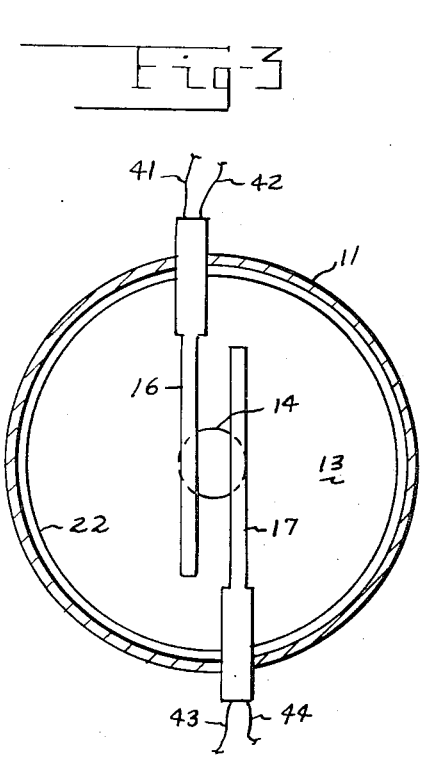
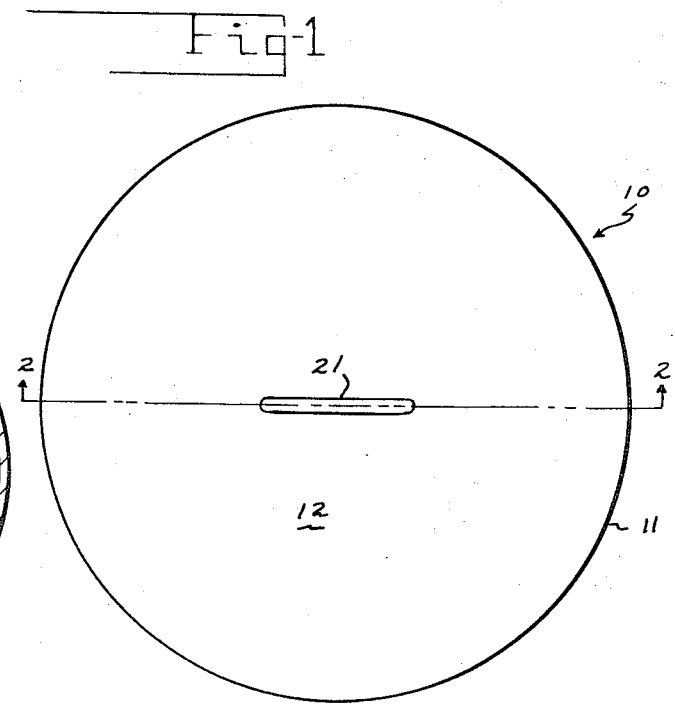
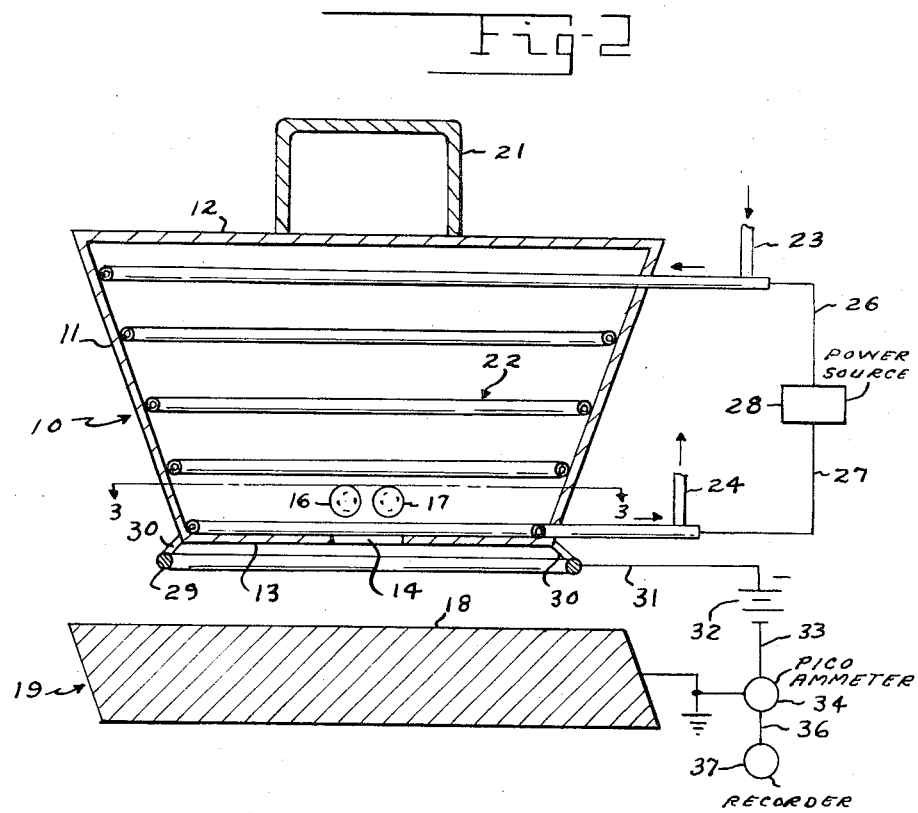

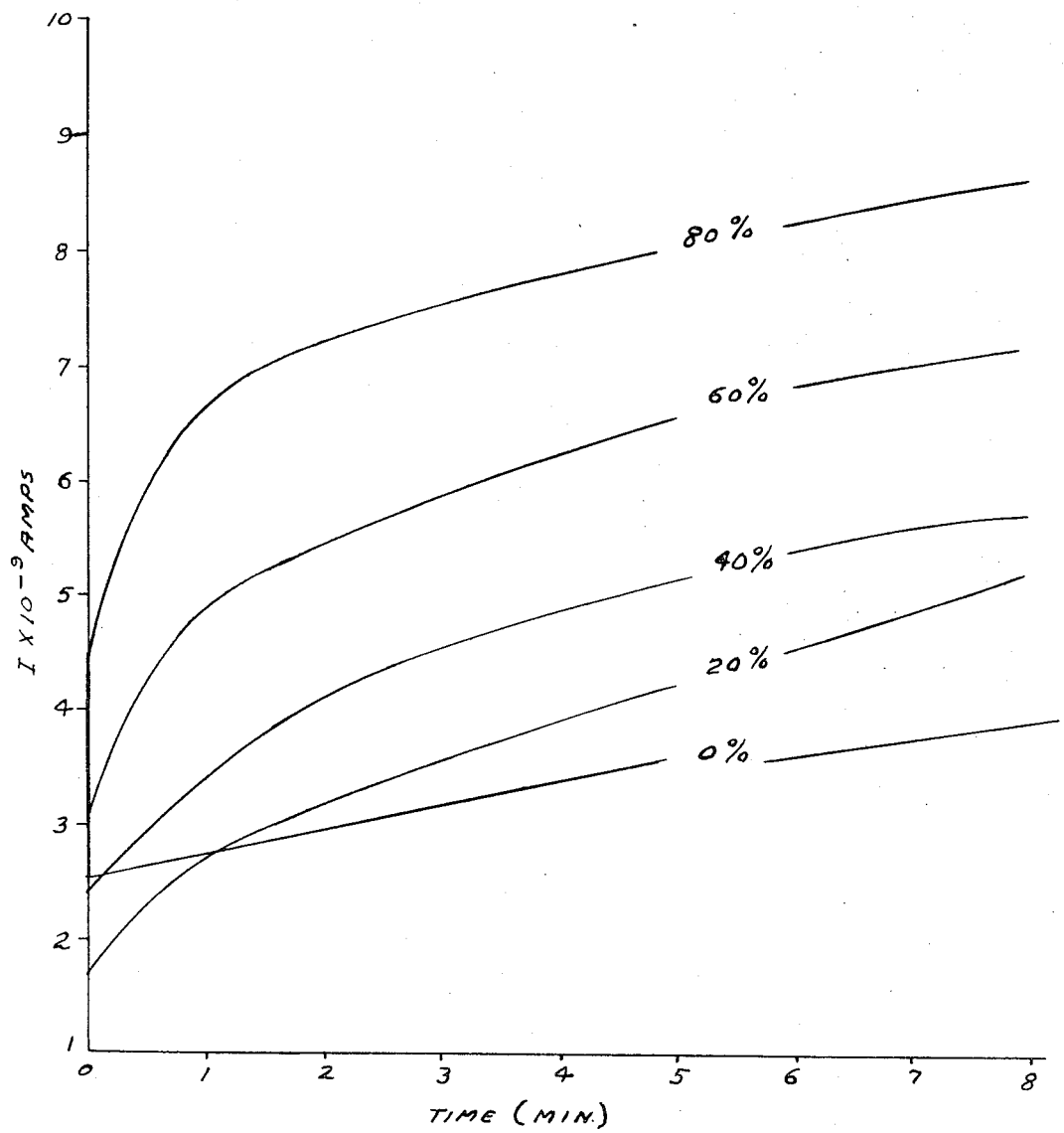

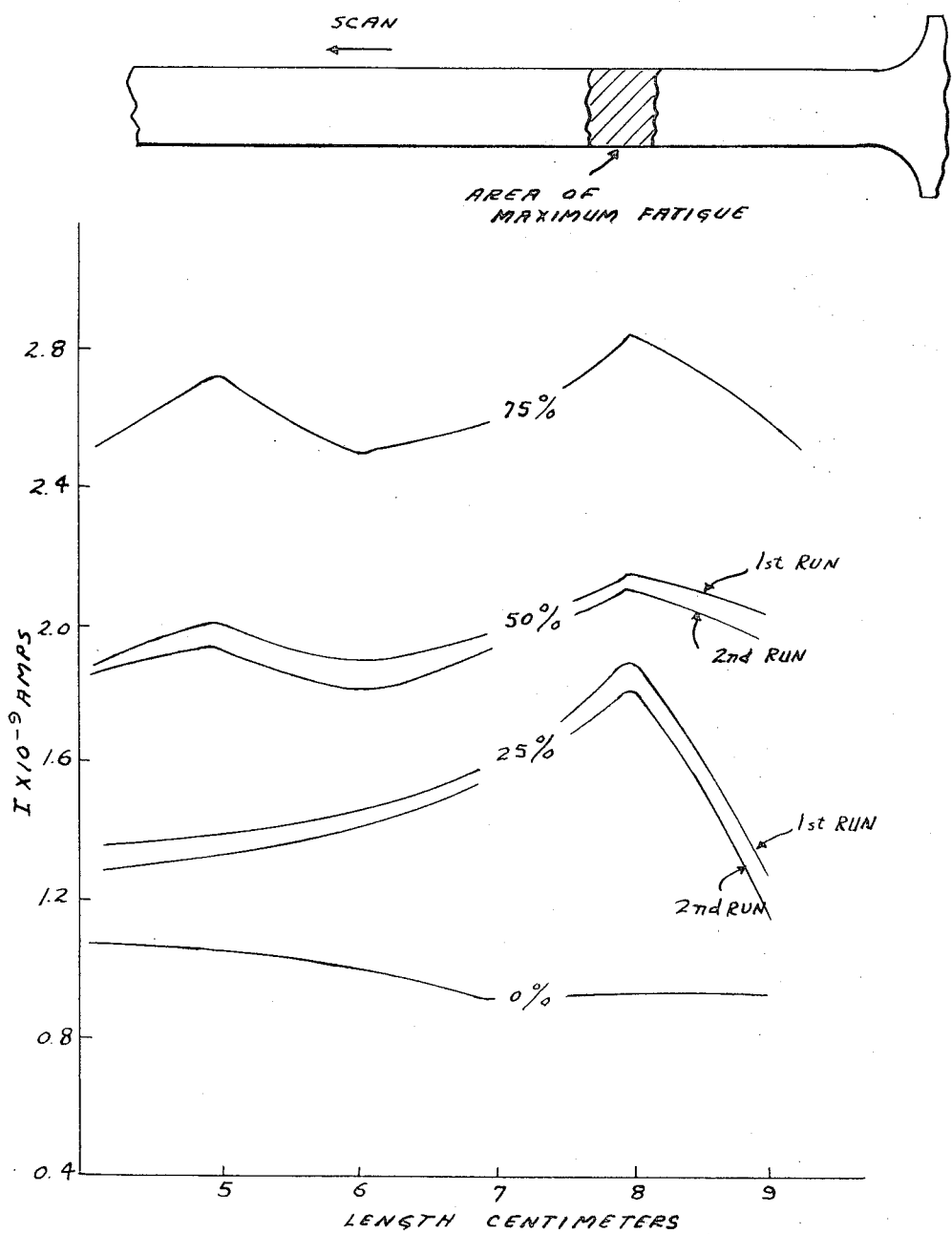

NON-DESTRUCTIVE TESTING OF METAL STRUCTURES BY MEASURING EXO-ELECTRON EMISSION

FIELD OF THE INVENTION

This invention relates to a method for the non-destructive testing of metal structures. In one aspect it relates to apparatus for use in the non-destructive testing of metal structures.

BACKGROUND OF THE INVENTION

In industry several non-destructive testing techniques have been employed to determine if structural members are free of defects. For example, in the building industry steel beams are inspected prior to use by ultrasonic and X-ray techniques to detect the possible presence of cracks. Other test methods that are practiced involve the use of a host of complex electro-acoustic devices, magnetic flux and brittle lacquer systems. Each of the prior art methods has its own characteristics, requiring in many instances skilled technicians.

Structural metal panels and other metal components of aircraft are inspected for flaws both before and after their incorporation into an aircraft. As mentioned above, there are many prior art techniques for testing for defects in structural members, but none of these methods provides a simple and practical test for determining the degree of fatigue damage that a service component may have suffered or an indication of the period of time that it will continue to operate without failure.

It is an object of this invention, therefore, to provide an improved method for the non-destructive testing of structural metal members.

Another object is to provide a non-destructive method for testing an aircraft structural member whereby the strength or useful remaining life of the member can be determined.

A further object of the invention is to provide an apparatus for the non-destructive testing of metal structures.

Still another object of the invention is to provide a non-destructive test apparatus which is portable and does not require the services of skilled technicians.

Other objects and advantages of the invention will become apparent to those skilled in the art upon consideration of the accompanying disclosure and the drawing, in which:

FIG. 1 is a plan view of a component of the apparatus used in the practice of the present invention;

FIG. 2 is a sectional view taken along line 2—2 of FIG. 1 and includes other components of the test apparatus as well as an elevational view, in section, of a specimen to be tested;

FIG. 3 is a sectional view taken along line 3—3 of FIG. 2.

FIG. 4 is a graph showing the exo-electron current as a function of time for aluminum specimens at various fatigue levels; and FIG. 5 is a graph showing the results obtained by using the apparatus of this invention in scanning along aluminum specimens that have been fatigued to different levels.

SUMMARY OF THE INVENTION

Broadly speaking, the present invention resides in a method for the non-destructive testing of a metal structure. The method comprises the steps of heating the structure in the presence of ultraviolet light to a temperature sufficient to cause exo-electron emission from the structure; continuously measuring an electrical current resulting from exo-electrons flowing from the structure to a metal collector maintained at a positive potential; and determining the magnitude of the electrical current as a measure of fatigue damage. In a more specific embodiment of the method of the invention successive portions of the structure are heated in the presence of ultraviolet light to a temperature sufficient to cause exo-electron emission from the structure while continuously measuring an electrical current resulting from exo-electrons flowing from the portions of the structure to a metal collector maintained at a positive potential. Any substantial increase in electrical current indicates the portion of the structure that has suffered fatigue damage.

In another embodiment, the present invention is concerned with an apparatus for the non-destructive testing of metal structures. The apparatus comprises an induction heating means; a source of ultraviolet radiation associated with the heating means and adapted to light a limited area of a grounded metal structure; a metal exo-electron collector means positioned below the induction heating means, the collector means being normally at a positive potential; a picoammeter connected to the collector means and to ground; and a recorder operatively connected to the picoammeter.

Referring now to the drawing, apparatus is illustrated that is particularly adapted for conducting the method of this invention. In the figures of the drawing, identical reference numerals have been utilized to designate the same elements. As shown in FIGS. 1 and 2, an induction heater 10 comprises a metallic container or concentrator 11 having a top closure member 12 and a bottom closure member 13. As depicted, container 11 is in the form of an inverted frustum. An opening 14 in closure member 13 makes it possible for ultraviolet radiation from ultraviolet lamps 16 and 17 to contact a portion of surface 18 of metallic structure 19. It is noted that the metallic structure is grounded. Attached to top closure member 12 is an insulated handle 21 which provides means for moving the induction heater in scanning operations.

An induction heating coil 22 disposed within concentrator 11 is attached to its walls by any suitable means, such as by welding. The heating coil, which is tubular in form, is provided with an inlet 23 and an outlet 24 which furnish means for circulating a coolant, such as water, through the coil so as to prevent its overheating. The ends of the coil are connected by means of electrical leads 26 and 27 to a power source. The power source can conveniently be a motor generator capable of delivering an alternating current of a controlled number of cycles.

Positioned below bottom closure member 13 of concentrator 11 is electron collector 29 which is in the form of a metal ring. The ring, as illustrated, has a circular cross section, but it can be of any desired shape, e.g., square, rectangular or elliptical. In order to minimize heating by the induction coil, its diameter is greater than that of the bottom closure member. The ring is attached to concentrator 11 by means of a plurality of insulators 30 which can conveniently be formed of a ceramic, such as porcelain, or a thermosetting resin, such as a phenol-formaldehyde resin. The electron collector is maintained at a positive potential by being connected through electrical lead 31 to the positive terminal of battery 32. Connected to the negative terminal of the battery by means of electrical lead 33 is a picoammeter 34 which has the capability of measuring very small current flow. The output of the picoammeter is connected through lead 36 to the input of recorder 37 which records graphically the electrical current measured by the picoammeter. The picoammeter is depicted as being connected to the same ground as structure 19, but it is to be understood that the instrument can be separately grounded.

Concentrator 11, coil 22 and collector 29 are formed of a metal which is a good conductor. While it is usually preferred to utilize copper, other metals or alloys having good conductive properties, such as silver or aluminum, can be used. The electrical leads connected to the power source and the battery are of such a length as to permit the induction heater and associated elements to be moved, e.g., for the purpose of scanning portions of a structure. Also, lines 23 and 24 connected to coil 22 are in the nature of flexible tubing, such as plastic or rubber tubes, to permit the desired movement of the apparatus.

Reference is now made to FIG. 3 of the drawing. As shown in this figure, ultraviolet lamps 16 and 17 pass through openings in the side of concentrator 11 that are opposite to one another. The lamps are positioned directly above opening 14 formed in the bottom closure member. A support (not shown) in the form of a bracket attached to each lamp and resting on or attached to closure member 13 can be utilized to ensure that the lamps remain in fixed position. Electrical leads 41 and 42 attached to lamp 16 and leads 43 and 44 attached to lamp 17 are connected to a source of alternating current. As with the other electrical leads, these leads are sufficiently long to permit movement of the induction heater and the attached electron collector.

In carrying out a test with the apparatus shown in FIGS. 1, 2 and 3 to determine the presence of cracks or fatigue damage in a specimen, metal structure 19 to be tested is heated inductively to a desired temperature. The induction heating is accomplished by passing an alternating current, e.g., a 1,000 to 5,000 cycle alternating current, from motor generator 28 through coil 22. A coolant is circulated through the induction coil by means of inlet and outlet lines 23 and 24 in order to prevent overheating of the coil. The structure to be tested can be fabricated from any metal, such as aluminum, steel, nickel, titanium and the like.

The temperature to which the structure is heated will depend upon the particular metal of which the structure is made. In general, the temperature is sufficient to stimulate, as described below, a measured current ranging from about $10^{-14}$ to $10^{-9}$ ampere. In the case of aluminum, a temperature of about 90° C has been found to be satisfactory, but the temperature should not exceed about 120° C. The temperature in the case of any metal should be below that which will affect the metallurgical properties of the metal as by altering its crystalline structure.

The heating step is preferably connected with the ultraviolet lamps in the on position. Furthermore, it is important that the lamps be positioned immediately above opening 14 in concentrator 11. Because of this arrangement, the ultraviolet light impinges upon a limited area of the structure about equal to the size of the opening. Because of the impingment of ultraviolet radiation on this limited area, the exo-electron emission from the area as compared to unexposed portions of the surface area is increased by a substantial amount, e.g., by a factor of about 50. As a result it is possible to test limited areas of a metal structure for fatigue damage. By being connected to the positive terminal of battery 32, which can conveniently be a 90 volt battery, collector 29 is at a positive potential. As a result of the heating of the structure, exo-electrons flow from the heated portion to the electron collector. The amount of current caused by this flow of electrons is measured by picoammeter 34 and this measurement is recorded on recorder 37. The amount of current recorded is dependent upon the number of exo-electrons emitted from the surface of the structure, the emission being greater from a damaged area. Because of the heating of an area of the structure in which fatigue damage has occurred, there is an increase in exoelectron emission from that area with a concomitant increase in the measured current. A comparison of this recorded current measurement with that obtained from testing an area which has not undergone fatigue damage will indicate the area of fatigue damage and provide an indication of the extent of the damage.

A more comprehensive understanding of the invention can be obtained by referring to the following illustrative examples which are not intended, however, to be unduly limitative of the invention.

EXAMPLE 1

A series of tests was conducted, utilizing apparatus similar to that shown in the drawing. The specimens used in the tests were formed of aluminum and had a dog bone configuration (7.5 inches × 0.5 inch × 0.90 inch). Prior to use in the tests, the aluminum specimens were annealed. The specimens were fatigued in a resonant machine. In order to establish a mean lifetime, 10 specimens were run to failure, and it was determined that the average number of cycles was 147,000.

Specimens were thereafter fatigued to a fraction of their expected life, i.e., 20 percent, 40 percent, 60 percent and 80 percent. These specimens as well as a specimen which had not been fatigued (0 percent) were then tested for exo-electron emission. In the tests, the specimens were heated in ambient air by the induction heater, and this temperature was 90° C after 8 minutes. The ultraviolet light was turned on during the heating period. The electron collector was connected to the positive terminal of a 90 volt battery.

In conducting the tests, the induction heater and electron collector were disposed with relation to the specimens in substantially the same position as shown in FIG. 1 of the drawing. In FIG. 4, there is reproduced the tracings from the recorder for the several runs. These curves show the exo-electron current as a function of time for the various fatigue levels. It is seen that there is a distinct relationship between fatigue and exo-electron emission. Thus, the greater the fatigue damage the greater is the exo-electron emission as indicated by the increases in current.

The data obtained in the runs demonstrate that the method of this invention is effective in determining whether a structure has been subjected to fatigue damage. Furthermore, the magnitude of the current resulting from the exo-electron emission is a measure of the fatigue damage of the structure. Thus, the method of this invention makes it possible to make a decision as to whether it is safe to continue utilization of a structure. This aspect of the method of this invention is particularly important in the case of aircraft. By applying the test method of this invention after landing an aircraft, it is possible to determine whether it is safe to continue the aircraft in service. This is an important advantage over prior art methods which are only suitable for locating a damaged component.

EXAMPLE II

A series of tests was conducted in which specimens similar to those described in Example I was utilized. In these runs specimens were fatigued to 25 percent, 50 percent and 75 percent of their expected life while one specimen was not fatigued.

The runs were conducted, utilizing the apparatus shown in the drawing. Furthermore, the runs were conducted under the same conditions as described in Example I. However, instead of maintaining the induction heater with the attached electron collector in a fixed position with relation to the specimens, it was moved along the long axis of the specimens as indicated in FIG. 5. The tracing from the recorder for the runs are reproduced in FIG. 5 which shows the exo-electron current as a function of the length of the scanned specimens. In this figure a specimen is also shown with the cross hatched area indicating the area of maximum fatigue. This area in each of the specimens which were fatigued corresponds to the second or higher peak.

As seen from FIG. 5, the 25 percent and the 50 percent fatigued specimens were tested a second time. The curves obtained correspond very closely to the curves of the first runs except that the current resulting from exo-electron emission was slightly lower. The same area of maximum fatigue was indicated by the second or higher peak of each curve.

The data obtained in these runs demonstrate the capability of the method of this invention in detecting fatigued areas and determining the fatigue level.

As will be evident to those skilled in the art, various modifications of the invention can be made in view of the foregoing disclosure without departing from the spirit and scope of the invention.

We claim:

1. A method for the non-destructive testing of a metallic structure that comprises the steps of:
   a. heating the structure in the presence of ultraviolet radiation to a temperature sufficient to cause exo-electron emission from the structure;
   b. collecting the emitted exo-electrons by flowing same from the structure to a metal collector maintained at a positive potential;
   c. continuously measuring an electrical current resulting from the flow of the collected exo-electrons; and d. determining the magnitude of the electrical current as a measure of the fatigue damage.

2. The method according to claim 1 which comprises inductively heating the structure to a temperature sufficient to cause exo-electron emission from the structure.

3. The method according to claim 2 which comprises inductively heating the structure to a temperature such that the flow of the collected exo-electrons results in an electrical current ranging from about $10^{-14}$ to $10^{-9}$ ampere.

4. The method according to claim 1 which comprises heating a limited portion of the structure in the presence of ultraviolet radiation.

5. The method according to claim 4 which comprises comparing the magnitude of the electrical current with the magnitudes of electrical current resulting from the exo-electron flow from similar metal structures fatigued to a known fraction of the expected life of the metal structure.

6. The method according to claim 1 which comprises successively heating limited areas of the structure in the presence of ultraviolet radiation; continuously measuring the electrical current resulting from the flow of the collected exo-electrons, the measured electrical current of greatest magnitude indicating the area of maximum fatigue damage.

7. Apparatus for the non-destructive testing of a metal structure which comprises an induction heating means for heating a metal structure to be tested; a source of ultraviolet radiation associated with the heating means and adapted to light a limited area of the metal structure so as to cause exo-electron emission therefrom; a metal ring positioned below and in proximity to the induction heating means for collecting emitted exo-electrons; a picoammeter connected to the metal ring; and a recorder operatively connected to the picoammeter.

8. The apparatus according to claim 7 in which the induction heating means comprises a metal container having the form of an inverted frustum with top and bottom closure members; an opening formed in the bottom closure member; a tubular coil positioned within the metal container; and an ultraviolet lamp positioned in the metal container directly above the opening in the bottom closure member.

9. The apparatus according to claim 8 in which the tubular coil is connected to a power source and means are provided for circulating a coolant through the coil.

10. The apparatus according to claim 9 in which the metal ring is attached to and insulated from the metal container; the ring is connected to the positive terminal of a battery; and the picoammeter is connected to the negative terminal of the battery and to ground.

11. The apparatus according to claim 10 in which the metal container, the tubular coil, and the metal ring are fabricated from copper.

* * * * *